(12) United States Patent
Danner

(10) Patent No.: US 12,036,881 B2
(45) Date of Patent: Jul. 16, 2024

(54) MULTILEVEL MOTOR DRIVE WITH INTEGRATED BATTERY CHARGER

(71) Applicant: Jabil Inc., St. Petersburg, FL (US)

(72) Inventor: Jeffrey David Danner, St. Petersburg, FL (US)

(73) Assignee: Jabil Inc.

( * ) Notice: Subject to any disclaimer, the term of this patent is extended or adjusted under 35 U.S.C. 154(b) by 0 days.

(21) Appl. No.: 18/347,835

(22) Filed: Jul. 6, 2023

(65) Prior Publication Data

US 2024/0149718 A1 May 9, 2024

Related U.S. Application Data

(63) Continuation of application No. 17/240,760, filed on Apr. 26, 2021, now abandoned, which is a
(Continued)

(51) Int. Cl.
*B60L 53/22* (2019.01)
*B60L 50/60* (2019.01)
(Continued)

(52) U.S. Cl.
CPC .............. *B60L 53/22* (2019.02); *B60L 50/60* (2019.02); *B60L 55/00* (2019.02); *B60L 58/21* (2019.02);
(Continued)

(58) Field of Classification Search
CPC .......... B60L 53/22; B60L 50/60; B60L 55/00; B60L 58/21; B60L 2210/14; H02M 1/42; H02M 7/487; H02P 27/08
(Continued)

(56) References Cited

U.S. PATENT DOCUMENTS

| 5,517,401 A | 5/1996 | Kinoshita |
|---|---|---|
| 7,898,828 B2 | 3/2011 | Maasland |
| | (Continued) | |

FOREIGN PATENT DOCUMENTS

| CN | 2676485 Y | 2/2005 |
|---|---|---|
| CN | 102255542 A | 11/2011 |
| | (Continued) | |

OTHER PUBLICATIONS

International Search Report and Written Opinion mailed on Jun. 24, 2019 2019 in PCT/US2019/021845.
(Continued)

*Primary Examiner* — Paul Dinh
(74) *Attorney, Agent, or Firm* — Riverside Law LLP

(57) ABSTRACT

An apparatus, system and method for a multilevel electrical vehicle (EV) motor drive circuit with an integrated battery charger. The apparatus, system and method may include a direct current (DC) battery for the EV connected in parallel with a capacitance; and a three level inverter circuit in parallel with the DC battery and connected in neutral point bisection with the capacitance, comprising: a high frequency low voltage pulse width modulation circuit; and a low frequency fundamental switching circuit at least partially in parallel with the high frequency low voltage pulse width modulation circuit. Additionally included may be motor windings connected in neutral point bisection with the low frequency fundamental switching circuit; and a power factor correction boost charging circuit connected to the three level inverter circuit, and connected to an alternating current grid.

8 Claims, 4 Drawing Sheets

Related U.S. Application Data continuation of application No. 16/980,788, filed as application No. PCT/US2019/021845 on Mar. 12, 2019, now abandoned.

(60) Provisional application No. 62/641,809, filed on Mar. 12, 2018.

(51) Int. Cl.
  *B60L 55/00* (2019.01)
  *B60L 58/21* (2019.01)
  *H02M 1/42* (2007.01)
  *H02M 7/487* (2007.01)
  *H02P 27/08* (2006.01)

(52) U.S. Cl.
  CPC ............ *H02M 1/42* (2013.01); *H02M 7/487* (2013.01); *H02P 27/08* (2013.01); *B60L 2210/14* (2013.01)

(58) Field of Classification Search
  USPC ........................................................ 320/104
  See application file for complete search history.

(56) References Cited

U.S. PATENT DOCUMENTS

| | | | |
|---|---|---|---|
| 2005/0111246 A1 | 5/2005 | Lai | |
| 2009/0159348 A1 | 6/2009 | Oyobe et al. | |
| 2012/0163057 A1 | 6/2012 | Permuy et al. | |
| 2014/0247634 A1 | 9/2014 | Takizawa | |
| 2015/0061608 A1 | 3/2015 | Lee | |
| 2016/0268950 A1* | 9/2016 | Cho | H02M 7/487 |
| 2016/0344278 A1 | 11/2016 | Zargari et al. | |
| 2020/0280190 A1 | 9/2020 | Lehn | |
| 2021/0336556 A1 | 10/2021 | Akazawa et al. | |
| 2021/0384863 A1 | 12/2021 | Omata et al. | |
| 2023/0268844 A1* | 8/2023 | Menzi | B60L 53/22 363/13 |

FOREIGN PATENT DOCUMENTS

| | | |
|---|---|---|
| CN | 102593928 A | 7/2012 |
| CN | 104249628 A | 12/2014 |
| CN | 106533283 A | 3/2017 |
| DE | 102015225574 A1 | 6/2017 |
| EP | 3076539 A1 | 10/2016 |
| EP | 3171505 A1 | 5/2017 |
| WO | 2016059708 A1 | 4/2016 |
| WO | 2016146171 A1 | 9/2016 |
| WO | 2016180707 A1 | 11/2016 |
| WO | 2017082922 A1 | 5/2017 |

OTHER PUBLICATIONS

International Preliminary Report on Patentability, dated Sep. 15, 2020 in PCT/US2019/021845.
Chinese Office Action issued in App. No. CN201980031904, dated Oct. 20, 2023, 7 pages.
Extended European Search Report issued in App. No. EP23195393, dated Dec. 22, 2023, 6 pages.
Chinese Office Action issued in App. No. CN201980031904, dated May 28, 2024, 7 pages.
Yang et al., Technique on Switching Power Supplies, Machine Industry Press, Jan. 2004, pp. 274-275.

* cited by examiner

MULTILEVEL MOTOR DRIVE WITH INTEGRATED BATTERY CHARGER

CROSS-REFERENCE TO RELATED APPLICATION

This application is a Continuation Application of U.S. application Ser. No. 17/240,760 entitled: MULTILEVEL MOTOR DRIVE WITH INTEGRATED BATTERY CHARGER, filed Apr. 26, 2021, which is a Continuation Application of U.S. application Ser. No. 16/980,788, entitled: MULTILEVEL MOTOR DRIVE WITH INTEGRATED BATTER CHARGER, filed Sep. 14, 2020, which is a national stage application of International Patent Application No. PCT/US2019/021845, filed Mar. 12, 2019, entitled: MULTILEVEL MOTOR DRIVE WITH INTEGRATED BATTERY CHARGER, which claims the benefit of priority to U.S. Provisional Application No. 62/641,809, filed Mar. 12, 2018, entitled MULTILEVEL MOTOR DRIVE WITH INTEGRATED BATTERY CHARGER, the entirety of which is incorporated herein by reference as if set forth in their entireties.

BACKGROUND

Field of the Disclosure

The disclosure relates generally to electric vehicle batteries and, more particularly, to a multilevel motor drive with integrated battery charger for electric vehicles.

Description of the Background

As the number of electric vehicles on roads rapidly increases, the charging of those vehicles, and specifically the charging time and the distance that may be travelled on a charge for those vehicles, become ever more important aspects of electric vehicle ownership. Numerous considerations come into play when considering electric vehicle charging methodologies, such as total charging power, charging power per unit time, charging connection type, and electric vehicle specifications, all by way of example.

Systems and methodologies to address electric vehicle charging considerations have been considered. For example, U.S. Pat. No. 8,847,555 (the '555 patent), entitled "Fast charging device for an electric vehicle", the entire disclosure of which is hereby incorporated by reference herein, is directed to a device for charging a vehicle battery that includes a rectifier input stage configured to be connected to a power supply network, an inverter output stage configured to be connected to the battery, and a mechanism for regulating average current obtained from the input stage.

The input rectifier stage in the '555 patent is a buck rectifier stage. This buck rectifier stage and other aspects of the '555 patent necessitate a significant number of components specifically for battery charging that are not used during motor drive mode. For example, the '555 patent requires large filter capacitors on the AC grid input to the charging system.

The '555 patent additionally employs an interleaved boost stage using shared drive electronics and motor magnetics, i.e., the motor winding. This interleaved boost stage uses a two level drive inverter, as is illustrated in FIG. 2. This boost stage uses the motor windings as the boost inductor, and hence suffers from a high parasitic capacitance within the motor windings, and from associated leakage currents. Yet further, the '555 patent provides only a uni-directional AC charging, i.e., AC grid to electric vehicle batter, solution.

U.S. Pat. No. 9,260,022, entitled "Electric vehicle and power system and motor controller for electric vehicle", the entire disclosure of which is hereby incorporated by reference herein, teaches an electric vehicle and a power system, and a motor controller for an electric vehicle. The power system includes a power battery; a charging-discharging socket; a bidirectional DC/DC module connected with the power battery; a driving control switch connected with the power battery and the bidirectional DC/DC module; a bidirectional DC/AC module connected with the driving control switch and the power battery; a motor control switch connected with the bidirectional DC/AC module and a motor; a charging-discharging control module connected with the bidirectional DC/AC module and the charging-discharging socket; and a controller module connected with and configured to control the driving control switch.

The '022 patent uses a power factor correction (PFC) boost battery charger front end that employs dedicated PFC boost inductors. The '022 patent does not use the motor windings as a line filter during charging, and thus avoids the high parasitic capacitance of the motor windings and the undesired motor torque that affect the '555 patent.

The '022 patent necessitates a motor disconnect switch for the charge mode. Of significance, this motor disconnect switch must be rated for the full motor drive current.

As is the case in the '555 patent, the '022 patents uses a two level inverter stage for motor drive and for the PFC boost charge. Additionally taught is a DC/DC converter stage between the battery and the DC link capacitors. This DC/DC converter is needed to raise the DC-link voltage during charging, and to bypass the aforementioned switch during motor mode.

The '022 patent purports to have bi-directional AC grid to vehicle and vehicle to grid (V2G) capability. That is, the technology is suitable to receive charging power from the grid, and to discharge power to the grid.

An electric vehicle charging technology, provided by Continental under the brand "AllCharge", has been recently developed. This technology provides single phase, three phase, and DC charger compatibility, and up to 800V and 350 kW DC. This technology also uses existing drive train electronics for charging, with an additional DC/DC boost converter, and hence requires much more limited additional electronics than do the technologies of the '555 and '022 patents. This technology is also bi-directional.

Rather than a two level inverter, the three level inverter illustrated in FIG. 1 may provide several distinct advantages. For example, a three level inverter provides higher DC-link voltages in high power motor drives, and is more efficient than a two level inverter across a broader frequency range for a given DC-link voltage. This is, in part, due to the lower switching losses of the three level inverter.

This improved switching provided by the three level inverter lowers the dV/dt stress on the electric vehicle motor and on smaller common-mode voltage at bearing terminals, which increases motor life. Power switches are used, as discussed above, in much of the known art to open and close a charging circuit. However, a high change in current over a small change in time (di/dt) may degrade or even melt a switch. Thus, where a switch is used and when that switch is closed, the avoidance of a high potential difference (dV/dt) across the switch decreases switch stress and thus increases motor life.

Three level inverters better address electromagnetic compatibility (EMC) issues. EMC may occur because of the unintentional generation, propagation and reception of electromagnetic energy, which causes unwanted effects, such as electromagnetic interference (EMI) or physical damage in the charging system.

SUMMARY

The disclosure is and includes at least an apparatus, system and method for a multilevel electrical vehicle (EV) motor drive circuit with an integrated battery charger. The apparatus, system and method may include a direct current (DC) battery for the EV connected in parallel with a capacitance; and a three level inverter circuit in parallel with the DC battery and connected in neutral point bisection with the capacitance, comprising: a high frequency low voltage pulse width modulation circuit; and a low frequency fundamental switching circuit at least partially in parallel with the high frequency low voltage pulse width modulation circuit. Additionally included may be motor windings connected in neutral point bisection with the low frequency fundamental switching circuit; and a power factor correction boost charging circuit connected to the three level inverter circuit, and connected to an alternating current grid.

Additionally and alternatively, the disclosed apparatus, system and method may include an upper level bridge circuit connected between the battery positive and the capacitance neutral point; a lower level bridge circuit connected between the battery negative and the capacitance neutral point; and a first mid level bridge circuit connected between the output of the upper and lower level bridge circuits. The motor windings may be connected to an output of the first mid level bridge circuit.

BRIEF DESCRIPTION OF THE FIGURES

The disclosed non-limiting embodiments are discussed in relation to the drawings appended hereto and forming part hereof, wherein like numerals indicate like elements, and in which.

DETAILED DESCRIPTION

Figure 1:
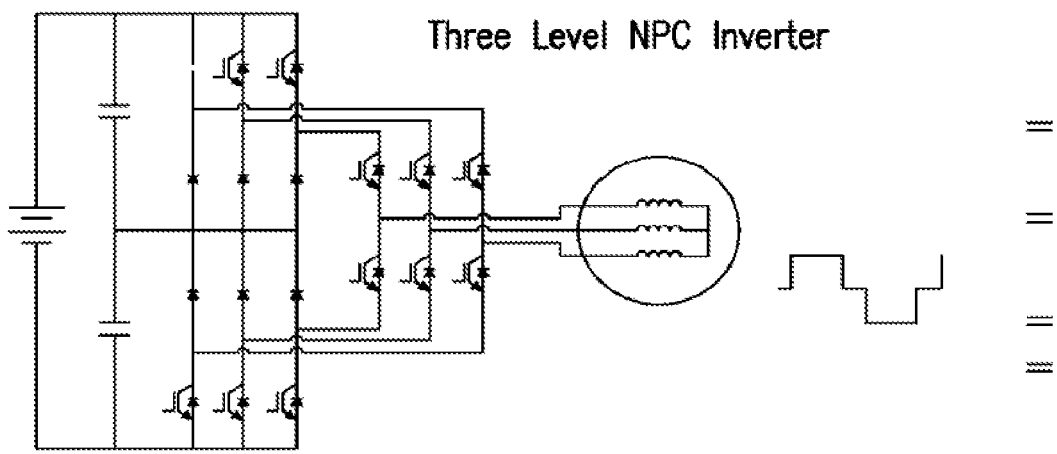
FIG. 1 is an illustration of the prior art.
Figure 2:
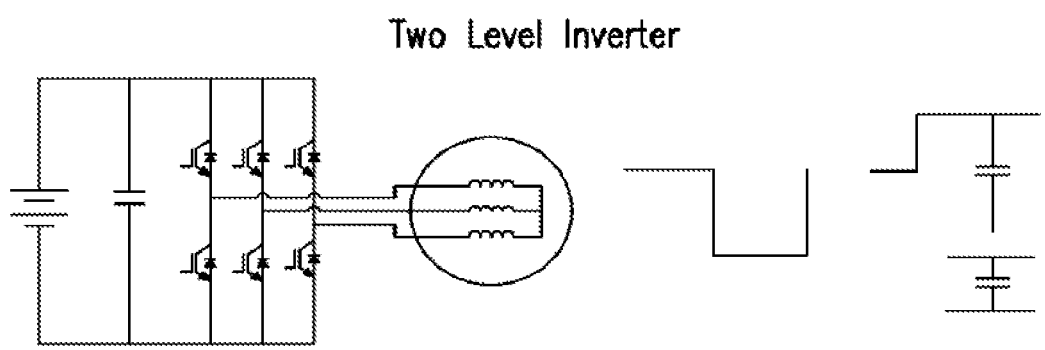
FIG. 2 is an illustration of the prior art.

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may be embodied in different forms. As such, the embodiments should not be construed to limit the scope of the disclosure. As referenced above, in some embodiments, well-known processes, well-known device structures, and well-known technologies may not be described in detail.

The terminology used herein is for the purpose of describing particular embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on", "upon", "connected to" or "coupled to" another element or layer, it may be directly on, upon, connected or coupled to the other element or layer, or intervening elements or layers may be present, unless clearly indicated otherwise. In contrast, when an element or layer is referred to as being "directly on," "directly upon", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). Further, as used herein the term "and/or" includes any and all combinations of one or more of the associated listed items.

Yet further, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the embodiments.

The disclosure relates to the charging of a battery, such as of an electric vehicle (EV), and more particularly to a charging device that may be incorporated, such as in the vehicle, to improve optionality of charging, such as of the vehicle. Such an approach may provide efficient charging, a high voltage DC link, and avoidance of the use of power switches via an active neutral point clamped multilevel inverter for the motor drive, and specifically via a diode connected three inverter level motor drive circuit with an integrated battery charger. An additional embodiment may use a dual battery and may provide bidirectional charge transfer capability.

One of the major drawbacks of electric vehicles relates to their respective availability. In practice, when a battery is discharged, the electric vehicle remains unavailable throughout the significant period that constitutes the requisite recharging time—which often extends to several hours.

More particularly, currently, large-capacity batteries are used in most EVs. Although such large capacity batteries may enhance the battery life of the EV, they require a large charge time to charge the large capacity battery. Specialized DC charging may charge a battery quickly, although problems such as high cost and large footprint limit the availability of such high power DC charging infrastructure.

Thus, it is typical that AC power is converted to DC power to recharge the EV's battery via the car's onboard charger. Chargers are provided that implement different rates for charging levels. For example, "level 3" chargers generally charge much faster than "level 1" or "level 2" chargers. In short, level 1 and level 2 chargers provide AC electricity to the EV's onboard charger, while a level 3 charger bypasses the onboard charger and provides DC electricity directly to the EV's battery, such as using some shared electronics with the electric vehicle's motor drive. Embodiments of the present disclosure may provide such a high-rate charger by providing DC power directly to the battery.

This may be accomplished, in part, by providing a high voltage DC link via a multilevel inverter. More specifically, in charging configurations, in a first stage, incoming AC power may be converted to DC, and the DC voltage made available to a DC bus. This bus acts as a link between the converter and the inverter circuit, and thus the DC voltage of this bus is called the DC link voltage. A high voltage DC link may provide for higher efficiency EVs than conventional configurations. Further, an active neutral point clamped inverter for the motor drive may prove an effective design choice for use in conjunction with such a high voltage DC link. Yet further, diode connected charging components may provide low impact and low cost additional components to effect such a high voltage DC link.

Figure 3:
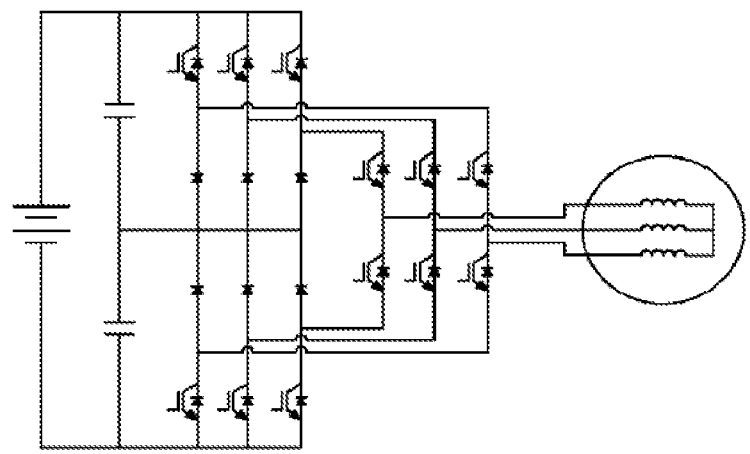
FIG. 3 is an illustration of the prior art.
Figure 4:
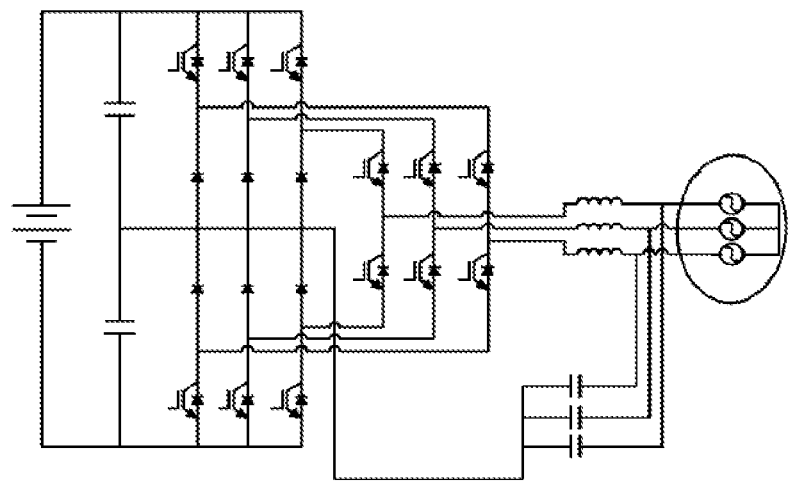
FIG. 4 is an illustration of the prior art.

FIGS. 3 and 4 illustrate use of three level inverter circuits. More specifically, FIG. 3 illustrates a three level inverter motor drive circuit, and FIG. 4 illustrates a three level inverter battery charger circuit. A benefit of using multilevel, i.e., three level, inverters instead of conventional two level inverters, may provide a high value of DC-link voltage that needs to be employed in EV applications. For high voltage and high power systems, instead of using switches with high voltage ratings in series, it may prove beneficial to connect stages, or levels, of switches, such as the transistor-based switch stages of FIGS. 3-6 (which may use stages of IGBT transistors, by way of non-limiting example), having low-voltage ratings. Use of such levels may avoid undue dV/dt stresses that stem from the use of power switches in series, and allow faster switching than switches having higher voltage ratings, thus resulting in switching harmonics of higher frequencies which can be filtered out easily.

Figure 5:
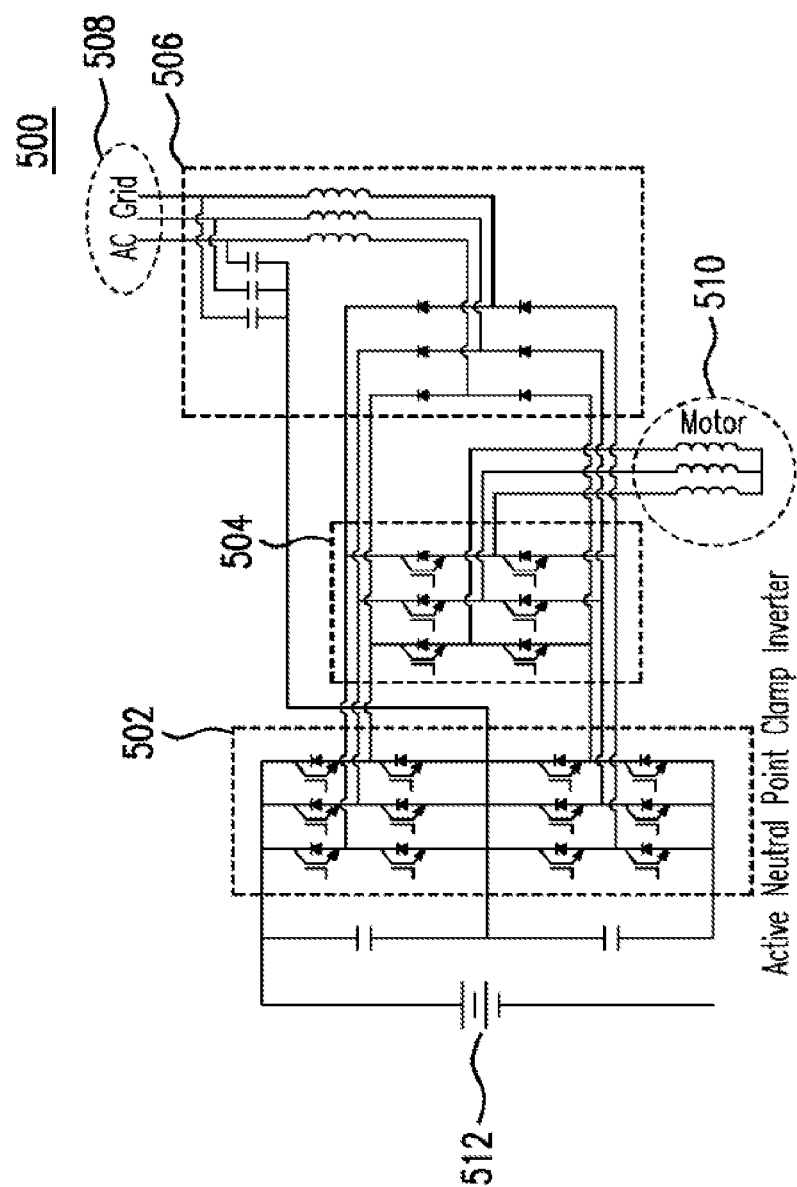
FIG. 5 is an illustration of aspects of the embodiments.

FIG. 5 illustrates a three level inverter motor drive circuit with an integrated battery charger, in accordance with certain embodiments of the present disclosure. More specifically, the circuit of FIG. 5 may act as an active neutral point clamp inverter 500 that necessitates only very limited electronics beyond those needed for the motor drive system, and which avoids the need for high power switches in series, thereby avoiding dV/dt stresses.

In the illustrated embodiment of FIG. 5, inverter 500 includes a high frequency pulse width modulation (PWM) switching portion 502; a low frequency fundamental switching portion 504; and an additional power factor correction (PFC) boost charging portion 506. Also shown in the illustration are the incoming AC grid power 508, the motor drive windings 510, and a battery 512, such as an EV battery to be charged.

The components 502, 504, 506 provide a high voltage DC link to battery 512, operating on the power provided by AC grid power 508. This high voltage DC link uses less current to provide the same power than two level inverters, and such a three level inverter configuration may provide greater efficiency than a two level inverter equivalent, which leads to reduced heat sink needs.

Moreover, it should be noted that there is no necessity for a DC boost converter in the embodiment of FIG. 5. Rather, the embodiment includes a diode-connected PFC boost portion 506. This PFC boost correction portion 506 involves passive correction, wherein the reactive power of the system may be compensated for by an equal but opposite amount of reactive power.

The diode-connected boost PFC portion 506 is a relatively simple and low-cost circuit. As illustrated, the only extra components required beyond those of the three level inverter may be diodes, capacitors and inductors. However, even with these limited additional components, the PFC boost portion 506 helps eliminate the need for a high current motor disconnect switch for charge mode operation, which, as discussed above, may lead to charging system degradation and breakdown. Consequently, embodiments of the present disclosure may significantly improve system performance over conventional approaches like those discussed above, while limiting system degradation and breakdown.

The high frequency low voltage PWM switching portion 504 may use smaller charging boost inductors and filter capacitors than conventionally employed, further supporting improved switching efficiency, at least in that the dV/dt motor stresses during motor switching are further reduced through the use of the high frequency low voltage PWM switching portion 504.

It will be appreciated that the embodiment illustrated in FIG. 5 provides a b-directional active motor drive with active bridge connected boost components. This configuration provides bi-directional charging, better switching loss distribution options, and a high level of configurability. Of course, in light of the embodiment of FIG. 5, the skilled artisan will appreciate that this embodiment may be operated uni-directionally, which provides a lower cost of additional charging components and good utilization of shared power switching components. Similarly, minor modifications to FIG. 5, and in particular the removal of select switching from in the PWM switching portion 502, enables a bi-directional passive motor drive with active bridge connected boost components; however, such a configuration would lead to a higher cost of charging bridge switching devices, and a decreased utilization of shared power switching components.

Figure 6:
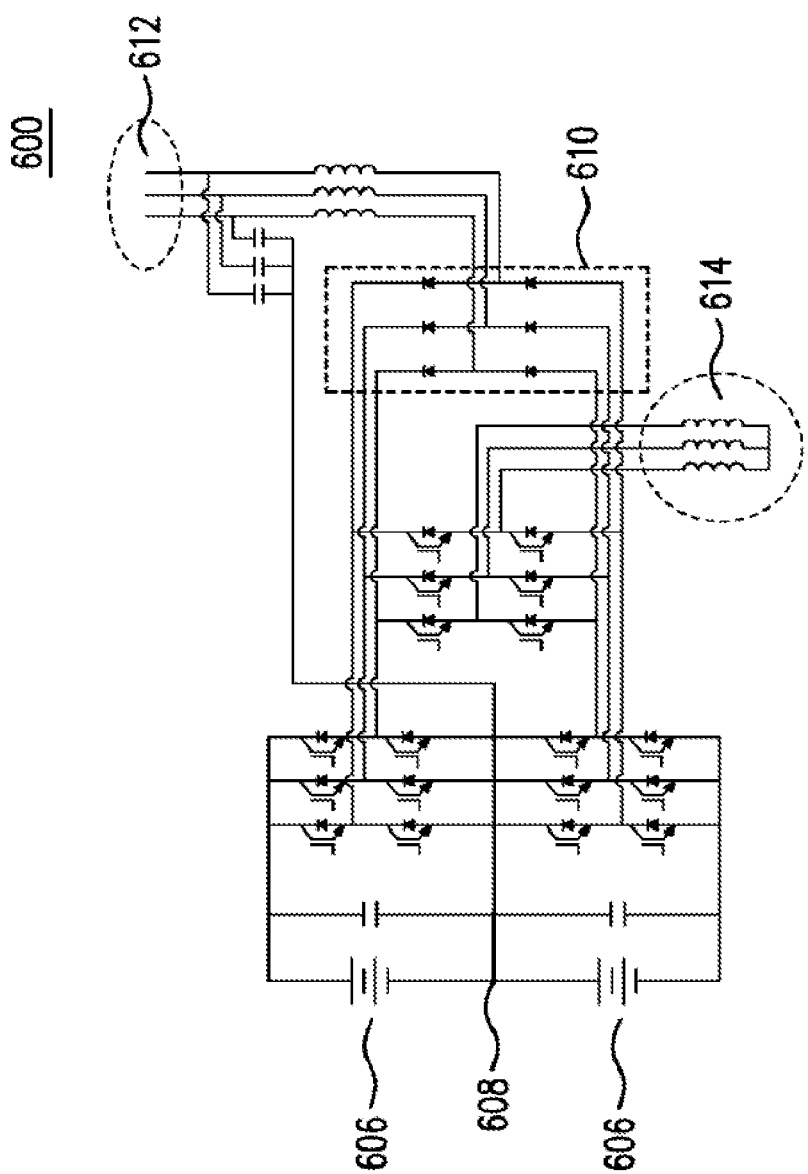
FIG. 6 is an illustration of aspects of the embodiments.

FIG. 6 illustrates a three level inverter motor drive circuit with an integrated battery charger, in a center tapped battery configuration 600, according to certain embodiments of the present disclosure. More specifically, FIG. 6 illustrates a center tapped battery 606 connected to a DC link neutral point 608. Further provided in FIG. 6 is a bidirectional plug-in energy portion 610, which includes transistor-connected charging components to provide for bi-directional charge transfer. This bidirectional power transfer includes EV to AC grid, and EV to EV, connections 612 as will be appreciated by the skilled artisan. Motor drive windings 614 are also shown.

Thus, FIG. 6 provides a dual battery EV drive system with bi-directional AC power transfer capabilities. In certain embodiments of the present disclosure, the dual 400V battery sections 606 may produce an 800V DC link. Moreover, such an embodiment 600 may provide a wide operating range without needing a DC boost converter stage. Thereby, certain embodiments are compatible with low and high voltage DC fast charging.

Additionally, the illustrated configuration may provide a low voltage single battery connectivity option. Such an option may provide accessory power, such as for an air conditioning compressor, by way of non-limiting example. Similarly, accessory power may be provided in the form of a 12V DC conversion.

Moreover, embodiments of the present disclosure may provide proportional power delivery control from each battery, which may allow for a single battery motor drive and which provides inherent operational redundancy. Battery balancing may readily occur during operation based on this proportional power control, and this may enable an energy transfer balancing mode via the motor inductive winding 614 between the batteries 606.

Additionally, embodiments of the present disclosure like that shown in FIG. 6 may allow for the integration of high frequency switching electronics and DC link capacitors in proximity to the battery 606, in part due to the controlled battery proportionality of the dual battery operation. This may, in turn, allow for smaller DC link capacitor requirements. Thus, in conjunction, the foregoing advantages may provide the potential for battery-integrated converter stages.

Thus, some embodiments provide a higher voltage, higher power, higher efficiency EV charging system than is available in the known art. The embodiments have reduced power conversion stage needs, less conduction and switching loss (and hence less need for heat sinking), less cost, and less weight than prior art embodiments.

The sharing of components between the motor drive and charging systems, through the use of a three level inverter system, also eliminates the need for a high power switch(es) for motor disconnect. This avoidance of dV/dt stresses decreases voltage stresses on the discussed system, and thereby improves the motor operating range.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. An electrical vehicle (EV) motor drive circuit with an integrated battery charger, comprising:
    a direct current (DC) battery for the EV connected in parallel with a capacitance;
    a three level inverter circuit in neutral point bisection with the capacitance, the three level inverter circuit comprising:
        a high frequency low voltage pulse width modulation circuit;
        a low frequency fundamental switching circuit at least partially in parallel with the high frequency low voltage pulse width modulation circuit;
    motor windings in neutral point bisection with the low frequency fundamental switching circuit; and
    a power factor correction boost charging circuit connected to the three level inverter circuit, and connected to an alternating current grid.

2. The drive circuit of claim 1, wherein the DC battery is a split battery, and wherein the split battery has a mid connection to the capacitance neutral point.

3. A multilevel electric vehicle (EV) motor drive with an integrated battery charger, comprising:
    a direct current (DC) battery for the EV connected in parallel with a capacitance, and with a three level inverter circuit connected in neutral point bisection with the capacitance, comprising:
        an upper level bridge circuit connected between the battery positive and the capacitance neutral point;
        a lower level bridge circuit connected between the battery negative and the capacitance neutral point;
    a first mid level bridge circuit connected between the output of the upper and lower level bridge circuits, and connected to motor windings at an output therefrom;
    a second mid level bridge circuit connected in parallel to the first mid level bridge circuit; and
    an inductance connected in series with an alternating current (AC) grid and an output of the second mid level bridge circuit output.

4. The EV motor drive of claim 3, wherein the DC battery is a split battery.

5. The EV motor drive of claim 4, wherein the split battery has a mid connection to the capacitance neutral point.

6. The EV motor drive of claim 3, wherein the upper level bridge circuit comprises a high frequency low voltage pulse width modulation circuit.

7. The EV motor drive of claim 3, wherein one of the upper level and the lower level bridge circuits comprises a low frequency fundamental switching circuit.

8. The EV motor drive of claim 7, wherein the low frequency switching circuit is at least partially in parallel with a high frequency low voltage pulse width modulation circuit.

* * * * *